United States Patent
Que et al.

(10) Patent No.: US 9,742,467 B2
(45) Date of Patent: Aug. 22, 2017

(54) NEAR-FIELD COMMUNICATION SYSTEM AND METHOD, AND TERMINAL

(71) Applicant: Shenzhen Goodix Technology Co., Ltd., Shenzhen (CN)

(72) Inventors: Bincheng Que, Shenzhen (CN); Zhichuan Liao, Shenzhen (CN); Cheng Wang, Shenzhen (CN); Xiaojun Chen, Shenzhen (NA)

(73) Assignee: Shenzhen Goodix Technology Co., Ltd., Shenzhen (CN)

( * ) Notice: Subject to any disclaimer, the term of this patent is extended or adjusted under 35 U.S.C. 154(b) by 0 days.

(21) Appl. No.: 15/218,002

(22) Filed: Jul. 23, 2016

(65) Prior Publication Data

US 2016/0337001 A1 Nov. 17, 2016

Related U.S. Application Data

(63) Continuation of application No. PCT/CN2014/084435, filed on Aug. 14, 2014.

(30) Foreign Application Priority Data

Jan. 24, 2014 (CN) .......................... 2014 1 0035742

(51) Int. Cl.
*G06F 3/044* (2006.01)
*H04B 5/00* (2006.01)
*H04W 76/02* (2009.01)

(52) U.S. Cl.
CPC ......... *H04B 5/0012* (2013.01); *H04B 5/0031* (2013.01); *H04W 76/023* (2013.01)

(58) Field of Classification Search
CPC .................................. G06F 3/044; H04B 5/00
See application file for complete search history.

(56) References Cited

U.S. PATENT DOCUMENTS

| | | | | |
|---|---|---|---|---|
| 2006/0250255 | A1* | 11/2006 | Flanagan | G08B 21/0208 340/573.4 |
| 2007/0074913 | A1* | 4/2007 | Geaghan | G06F 3/044 178/18.06 |
| 2008/0123599 | A1* | 5/2008 | Ishibashi | H04B 13/005 370/335 |
| 2010/0277304 | A1* | 11/2010 | Haartsen | H04W 52/0274 340/531 |
| 2011/0028091 | A1* | 2/2011 | Higgins | H04L 63/0492 455/41.2 |

(Continued)

FOREIGN PATENT DOCUMENTS

CN 103873113 A 6/2014

*Primary Examiner* — Cindy Trandai (57) ABSTRACT

Disclosed are near-field communication system, method and terminal. The near-field communication system includes a first terminal and a second terminal configured to: when it is detected that a coupling capacitance between the first terminal and the second terminal is less than a predetermined value, adjust a connection of a driving channel and/or a sensing channel of the second terminal, to adjust the coupling capacitance between the second terminal and the first terminal; and establish communication between the second terminal and the first terminal when it is detected that the coupling capacitance between the first terminal and the second terminal is greater than or equal to the predetermined value.

18 Claims, 6 Drawing Sheets

---

S101: When it is detected that a coupling capacitance between a terminal and another terminal is less than a predetermined value, adjust a connection of a driving channel and/or a sensing channel of the terminal, to adjust the coupling capacitance between the terminal and the other terminal S102: Establish communication between the terminal and the other terminal when the coupling capacitance is greater than or equal to the predetermined value (56) References Cited

U.S. PATENT DOCUMENTS

| | | | |
|---|---|---|---|
| 2013/0229930 A1* | 9/2013 | Akay | H04W 52/0245 370/252 |
| 2015/0031299 A1* | 1/2015 | Holman | H04W 4/005 455/41.2 |
| 2015/0147963 A1* | 5/2015 | Harada | H04W 52/0245 455/41.1 |
| 2015/0155916 A1* | 6/2015 | Kuo | G06F 3/041 455/41.1 |
| 2015/0215002 A1* | 7/2015 | Ho | H04B 5/0012 345/174 |
| 2016/0072555 A1* | 3/2016 | Peters | G06K 7/0008 455/41.1 |
| 2016/0380703 A1* | 12/2016 | Konanur | H04B 13/005 455/41.1 |

* cited by examiner

When it is detected that a coupling capacitance between a terminal and another terminal is less than a predetermined value, adjust a connection of a driving channel and/or a sensing channel of the terminal, to adjust the coupling capacitance between the terminal and the other terminal — S101

Establish communication between the terminal and the other terminal when the coupling capacitance is greater than or equal to the predetermined value — S102

FIG. 11

NEAR-FIELD COMMUNICATION SYSTEM AND METHOD, AND TERMINAL

CROSS-REFERENCE TO RELATED APPLICATIONS

The present application is a continuation of international application No. PCT/CN2014/084435, filed on Oct. 14, 2014, which claims priority to Chinese Patent Application No. CN201410035742.8, filed on Jan. 24, 2014, both of which are hereby incorporated by reference in its entireties.

TECHNICAL FIELD

The present disclosure relates to computer technologies, and in particular, relates to a near-field communication system, method and terminal.

BACKGROUND

During near-field communication between terminals by using a coupling effect between capacitive touch screens of the terminals, based on an existing touch identification of the capacitive touch screen, interaction of signals is implemented by configuring a primary and secondary transceiving mode. This communication manner has the characteristics of controllable communication range, signal security and the like, and may be used for identity confirmation and key transmission.

At present, the near-field communication manner achieves coupling via electric field signals of the touch screens. Since a communication process is subjected to a plurality of distribution parameters, use of these distribution parameters may cause the coupling effect of the electric field signals to be poor, or even cause the coupling effect to be offset. As a result, communication between the touch screens of the terminals may fail. Even in the case that the touch screens of the terminals are very close to each other, the communication between the terminals may still fail. Generally, positions of the terminals and angles between the terminals when the communication between the terminals fails are referred to as communication blind zones or communication dead zones.

Currently, a problem is that when the communication between the terminals is abnormal, generally a user may only reattempt to establish the communication between the terminals by changing the positions between the terminals. However, this manner subjects the communication between the terminals to external factors, and in addition the success rate of the communication between the terminals is poor and the efficiency of the communication is low. Further, the user's operation burden is increased to a great extent, thereby affecting the user experience.

SUMMARY

An embodiment of the present disclosure provides a near-field communication system. The near-field communication system includes a first terminal and a second terminal, wherein the second terminal is configured to: when it is detected that a coupling capacitance between the first terminal and the second terminal is less than a predetermined value, adjust a connection of a driving channel and/or a sensing channel of the second terminal, to adjust the coupling capacitance between the second terminal and the first terminal; and establish communication between the second terminal and the first terminal when it is detected that the coupling capacitance between the first terminal and the second terminal is greater than or equal to the predetermined value.

Another embodiment of the present disclosure provides a terminal, including: a first detecting module, configured to detect whether a coupling capacitance between the terminal and another terminal is less than a predetermined value; an adjusting module, configured to, when it is detected that the coupling capacitance between the terminal and the another terminal is less than the predetermined value, adjust a connection of a driving channel and/or a sensing channel of the terminal, to adjust the coupling capacitance between the terminal and the another terminal; and an establishing module, configured to establish communication between the terminal and the another terminal when it is detected that the coupling capacitance between the terminal and the another terminal is greater than or equal to the predetermined value.

A third embodiment of the present disclosure provides a method for near-field communication, comprising: when it is detected that a coupling capacitance between a terminal and another terminal is less than a predetermined value, adjusting a connection of a driving channel and/or a sensing channel of the terminal to adjust the coupling capacitance between the terminal and the another terminal; and establishing communication between the terminal and the another terminal when it is detected that the coupling capacitance between the terminal and the another terminal is greater than or equal to the predetermined value.

BRIEF DESCRIPTION OF THE DRAWINGS

The above described and/or additional aspects and advantages of the present disclosure would be obvious and simple to understand with reference to the description of the embodiments in combination with the accompanying drawings.

DETAILED DESCRIPTION

The embodiments of the present disclosure are described in detail hereinafter. Examples of the described embodiments are given in the accompanying drawings, wherein the identical or similar reference numerals constantly denote the identical or similar elements or elements having the identical or similar functions. The specific embodiments described with reference to the attached drawings are all exemplary, and are intended to illustrate and interpret the present disclosure, which shall not be construed as causing limitations to the present disclosure. On the contrary, the embodiments of the present disclosure cover all the variations, modifications and equivalents made within the spirit and scope as defined by the appended claims of the present disclosure.

It should be noted that terms such as "first", "second", and the like are merely used for illustration purpose during the description of the present disclosure, and shall not be understood as indicating or implying relative importance. In the description of the present disclosure, it should be noted that unless otherwise specified and defined, the terms "coupled" and "connected" and derivative forms of these words shall be understood in a broad sense, which, for example, may be understood as fixed connection, detachable connection or integral connection; may be mechanically connected or electrically connected; or may be directly connected, indirectly connected via an intermediate medium. Persons of ordinary skill in the art may understand the specific meanings of the above terms in the present disclosure according to the actual circumstances and contexts. In addition, during the description of the present disclosure, the term "multiple", "more" or "a plurality of" refers to at least two unless otherwise specified.

Any process or method description illustrated in the flowcharts or described herein in any manner may be understood as including one or a plurality of modules, segments or portions of codes of executable instructions for implementing specific logic functions or steps in the processes. In addition, the scope of the preferred embodiments of the present disclosure covers other implementations. The implementation of the functions or steps may not be subjected to the illustrated or discussed sequence; however, the functions may be implemented in a substantially simultaneous manner or in a contrary sequence according to the involved functions, which shall be understood by a person skilled in the art according to the embodiments of the present disclosure.

A near-field communication system, method and terminal according to the present disclosure are described with reference to the accompanying drawings.

Figure 1:
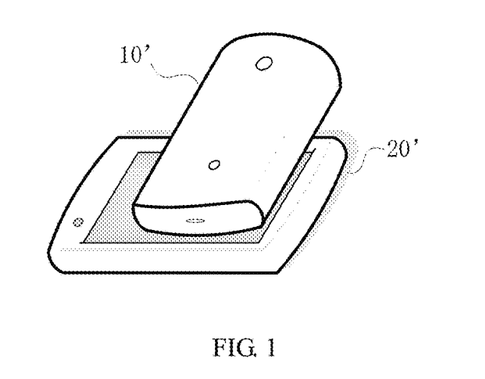
FIG. 1 is a schematic diagram illustrating communication between terminals in the related art.

FIG. 1 is a schematic diagram illustrating communication between terminals in the related art. As illustrated in FIG. 1, during near-field communication between terminals, although the terminals are very close to each other, generally an angle is formed between the terminals. When the angle is at specific positions, signal coupling between the touch screens of the terminals is very poor, which causes a failure of the communication between the terminals. In case of such a communication failure, a user may only reestablish communication between the terminals by changing the positions of the terminals. However, such a manner may increase the operation burden of the user to a great extent, and thus affect the user experience.

Figure 2:
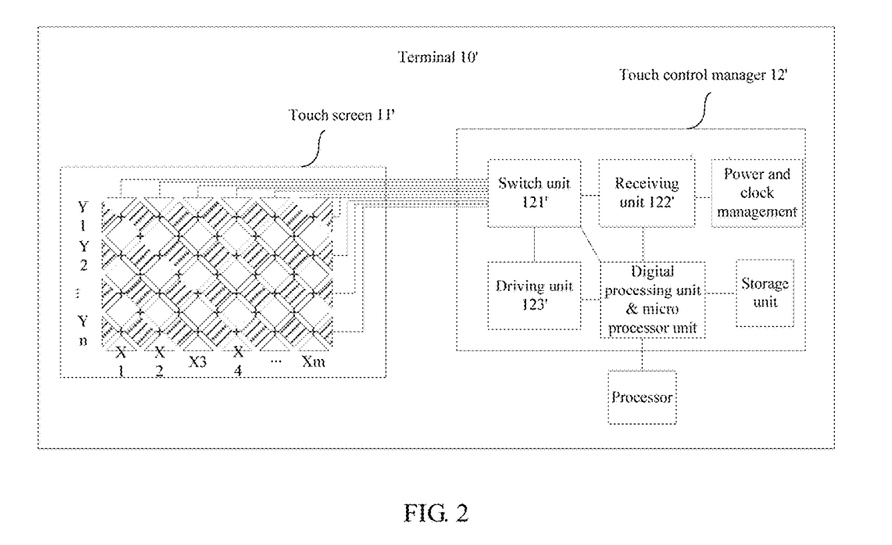
FIG. 2 is a schematic structural diagram illustrating a touch screen and a touch control manager in the terminal in the related art.

For example, FIG. 2 is a schematic structural diagram illustrating a touch screen and a touch control manager in the terminal in the related art. As illustrated in FIG. 2, a terminal 10' includes a touch screen 11' and a touch control manager 12'. The touch screen 11' is an input device of the terminal 10', which is generally a capacitive touch screen and achieves the effect of receiving data and sending data in the near-field communication between the touch screens. The touch control manager 12' is a managing module for managing the touch screen 11', and is mainly configured to perform sensing parsing (i.e., sensing the touch operation and parsing the data of operation) for a touch operation of the user and report a position coordinate of the user's touch operation to a processor of the terminal. The touch screen 11' includes two groups of channels, that is, driving channels $Y_1$-$Y_n$ of the driving signals and sensing channels $X_1$-$X_m$ of the sensing signals, wherein both the driving channels and the sensing channels can be formed by a plurality of routings respectively. It should be understood that the driving channels may be $X_1$-$X_m$ and the sensing channels may be $Y_1$-$Y_n$, in other embodiments.

The driving channels and the sensing channels of the touch screen 11' may send a touch signal generated by a user's touch operation to the touch control manager 12', and the touch control manager 12' includes a switch unit 121', a receiving unit 122' and a driving unit 123'. The switch unit 121' is configured to manage the driving channels and the sensing channels of the touch screen 11', and each channel of the touch screen 11' is connected to a specific circuit module via the switch unit 121'. The receiving unit 122' is configured to receive a signal of the touch screen 11', and under control of the switch unit 121', send a digitalized signal to a digital processing unit and a micro processor unit for processing. The driving unit 123' is configured to generate an analog signal for excitation, and has a specific driving capability. After the signal is transmitted through a switching channel of the switch unit 121', an excitation signal may be sent to a specific driving channel.

Figure 3:
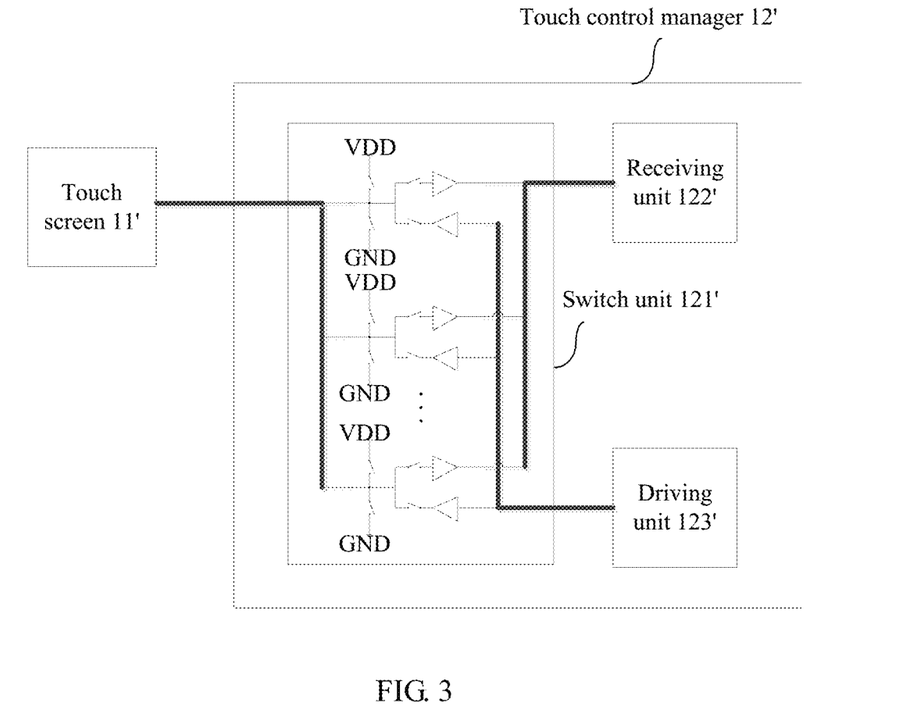
FIG. 3 is a schematic structural diagram illustrating a touch screen and a switch unit in the terminal in the related art.

Further, FIG. 3 is a schematic structural diagram illustrating a touch screen 11' and a switch unit 121' in the terminal in the related art. As illustrated in FIG. 3, the switch unit 121' includes a switch and a buffer matrix, and signals input or output via the touch screen 11' may pass through their respective switch circuits. Each switch circuit may be connected to a positive pole of a power supply, a system ground, an input buffer end or an output buffer end. Accordingly, all the channels of the touch screen 11' may be configured to have relevant electrical features according to actual needs.

Figure 4:
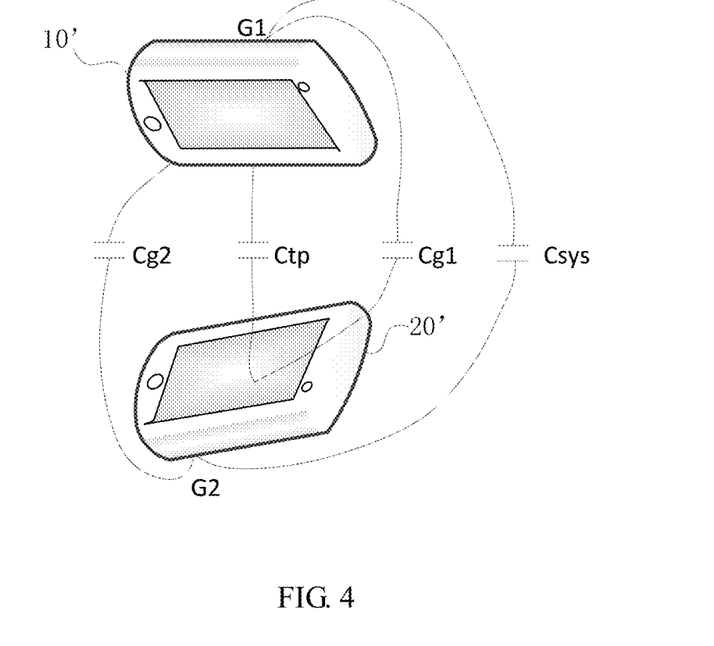
FIG. 4 is a schematic diagram illustrating an equivalent model of the communication between the terminals in the related art.
Figure 5:
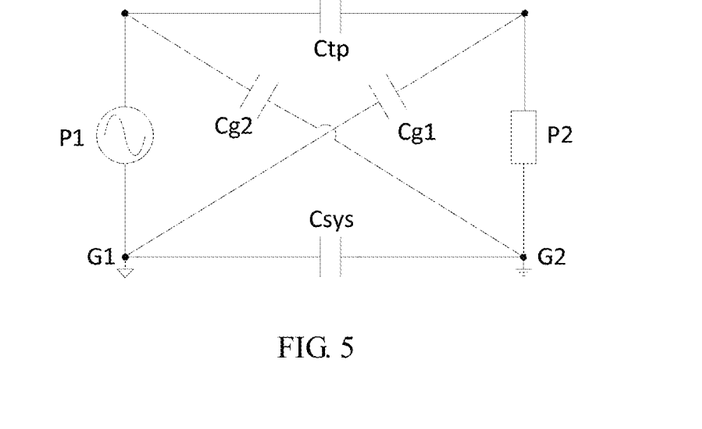
FIG. 5 is a circuit diagram illustrating the equivalent model of the communication between the terminals in the related art.

Therefore, during near-field communication between terminals, for example, as illustrated in FIG. 4, two mobile phones $P_1$ and $P_2$, wherein the mobile phone $P_1$ may be a signal sending terminal and the mobile phone $P_2$ may be a signal receiving terminal. The system ground GND of the mobile phone $P_1$ is $G_1$, and the system ground GND of the mobile phone $P_2$ is $G_2$. During near-field communication between the mobile phone $P_1$ and the mobile phone $P_2$, a coupling capacitance between a touch screen of the mobile phone $P_1$ and a touch screen of the mobile phone $P_2$ is $C_{tp}$, a coupling capacitance between the touch screen of the mobile phone $P_1$ and the system ground $G_2$ of the mobile phone $P_2$ is $C_{g2}$, a coupling capacitance between the touch screen of the mobile phone $P_2$ and the system ground $G_1$ of the mobile phone $P_1$ is $C_{g1}$, and a coupling capacitance between the system ground $G_1$ of the mobile phone $P_1$ and the system ground $G_2$ of the mobile phone $P_2$ is $C_{sys}$. Therefore, the circuit diagram as illustrated in FIG. 5 may be further derived, wherein the mobile phone $P_1$ is a signal sending terminal and may be replaced by an alternating current signal source, and the mobile phone $P_2$ is a signal receiving terminal and may be replaced by a resistance load.

In practical applications, it is intended to make a voltage $V_{p2}$ between two ends of the mobile phone $P_2$ to be as great as possible in physical layer. If the voltage $V_{p2}$ between two ends of the mobile phone $P_2$ is too small, the signal received by the mobile phone $P_2$ is poor. As a result, communication between the mobile phone $P_1$ and the mobile phone $P_2$ may fail. For brevity of the analysis, the resistance of the resistance load of the mobile phone $P_2$ may be ignored, and the following derivation may be obtained:

$$V_{P2} = \frac{C_{G1}}{C_{TP} + C_{G1}} \times V_{P1} - \frac{C_{SYS}}{C_{G2} + C_{SYS}} \times V_{P1}$$

Further, it may be obtained:

$$VP2 = 0, \text{ when } \frac{C_{G1}}{C_{TP}} = \frac{C_{SYS}}{C_{G2}}$$

That is, a plurality of combinations may lead to a case of $V_{P2}=0$, which signifies that the coupling signal of the mobile phone $P_2$ is 0, which is inevitable in the physical model of a fixed position between the mobile phone $P_1$ and the mobile phone $P_2$.

However, in the embodiments of the present disclosure, in the system of the mobile phone $P_2$, the coupling capacitance $C_{tp}$ between the touch screen of the mobile phone $P_1$ and the touch screen of the mobile phone $P_2$ may be changed by switching the connection manner of the driving channel and/or the sensing channel via software. By changing the coupling capacitance $C_{tp}$, the coupling capacitance $C_{g2}$ between the touch screen of the mobile phone $P_1$ and the system ground $G_2$ of the mobile phone $P_2$, and the coupling capacitance $C_{g1}$ between the touch screen of the mobile phone $P_2$ and the system ground $G_1$ of the mobile phone $P_1$ may also be changed. Accordingly, the case that $V_{P2}=0$ may be prevented, that is, the case where the coupling signal of the mobile phone $P_2$ is 0 may be prevented.

Figure 6:
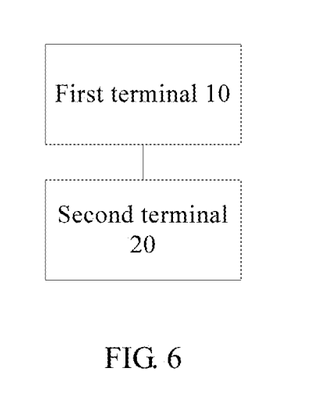
FIG. 6 is a schematic structural diagram of a near-field communication system according to an embodiment of the present disclosure.

FIG. 6 is a schematic structural diagram of a near-field communication system according to an embodiment of the present disclosure. As illustrated in FIG. 6, the near-field communication system includes a first terminal 10 and a second terminal 20.

To be specific, the second terminal 20 is configured to: when it is detected that a coupling capacitance between the first terminal 10 and the second terminal 20 is less than a predetermined value, adjust a connection of a driving channel and/or a sensing channel of the second terminal 20, to adjust the coupling capacitance between the second terminal 20 and the first terminal 10; and establish communication between the second terminal 20 and the first terminal 10 when it is detected that the coupling capacitance between the first terminal 10 and the second terminal 20 is greater than or equal to the predetermined value.

In the embodiments of the present disclosure, the first terminal 10 and the second terminal 20 may be both, but not limited to, one of a mobile phone, a laptop computer, a tablet computer, a palm computer and a POS machine; and the first terminal 10 is an initiating end of the communication and the second terminal 20 is a peer end of the initiating end. In other words, the first terminal 10 is an initiator of the communication and the second terminal 20 is a receptor of the communication. To be specific, the near-field communication system according to the embodiments of the present disclosure is described by using an exemplary case where the first terminal 10 and the second terminal 20 are both mobile phones, and the first terminal 10 and the second terminal 20 both have a touch screen as an example.

When the second terminal 20 approaches the first terminal 10, the second terminal 20 enters a near-field communication mode, and then the second terminal 20 initializes its own settings, for example, selecting a driving channel and a sensing channel of its own display screen, switching a switch unit connected to the driving channel and the sensing channel of the display screen, and setting a receiving unit or the like connected to the display screen. The display screen may be a touch screen, which may be preferably a capacitive touch screen.

Then, the second terminal 20 detects whether the coupling capacitance between the first terminal 10 and the second terminal 20 is less than the predetermined value. To be specific, when the second terminal 20 enters the communication mode where the second terminal 20 is in a receiving state, the second terminal 20, in the communication mode, may monitor in real time a communication signal sensed by the second terminal 20 via the display screen thereof from the first terminal 10. The second terminal 20 may receive a communication signal from the first terminal 10 or send a communication signal to the first terminal 10 via, for example, a part of the driving channels and sensing channels in the display screen of the second terminal 20. In other words, it may be configured that the second terminal 20 receives/sends a communication signal via the entire screen of the display screen thereof, or it may be configured that the second terminal 20 receives/sends a communication signal via a part of the display screen thereof. In this way, a signal-to-noise ratio of the second terminal 20 may be improved, and power consumed by the second terminal 20 may be reduced. In other words, the second terminal 20 may detect in real time whether the coupling capacitance between the first terminal 10 and the second terminal 20 is less than the predetermined value within a predetermined window time period.

Then, if the second terminal judges that the coupling capacitance between the first terminal 10 and the second terminal 20 within the predetermined window time period is less than the predetermined value, and judges that the communication signal between the first terminal 10 and the second terminal 20 is a valid signal, the second terminal 20 adjusts the coupling capacitance between the second terminal 20 and the first terminal 10 by adjusting a connection of the driving channel and/or the sensing channel of the second terminal 20. In other words, if the second terminal receives no communication signal within the predetermined window time period or the received communication signal is relatively weak, that is, the coupling capacitance between the first terminal 10 and the second terminal 20 is smaller or 0, the driving channel and the sensing channel of the second terminal 20 are switched to implement electrical features of the second terminal 20 in another deployment. It should be noted that if the second terminal 20 judges that the coupling capacitance between the first terminal 10 and the second terminal 20 within the predetermined window time period is greater than or equal to the predetermined value, communication between the second terminal 20 and the first terminal 10 may be established.

In the embodiments of the present disclosure, after the second terminal 20 judges that the coupling capacitance between the first terminal 10 and the second terminal 20 within the predetermined window time period is less than the predetermined value, the second terminal 10 may further detect whether the time elapsed when the second terminal 20 requests to establish the communication with the first terminal 10 after entering the communication mode is greater than a predetermined threshold, and exit the communication mode when it is judged that the time elapsed for establishing the communication is greater than the predetermined threshold. In other words, if the second terminal 20 judges that the total time elapsed for establishing the communication exceeds the predetermined threshold, the second terminal 20 may directly terminate the communication with the first terminal 10.

Figure 7:
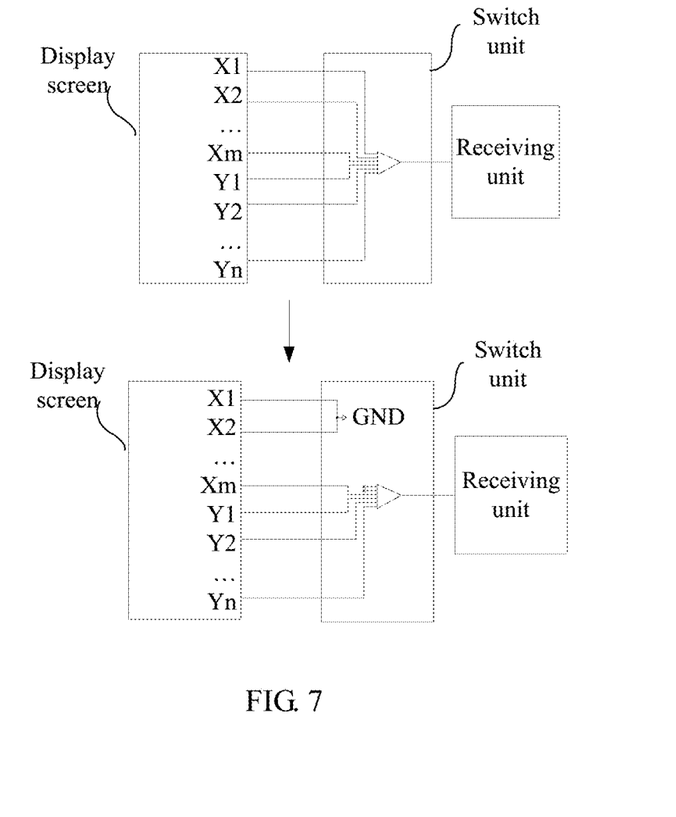
FIG. 7 is a schematic diagram illustrating switching of sensing channels of a second terminal according to an embodiment of the present disclosure.
Figure 8:
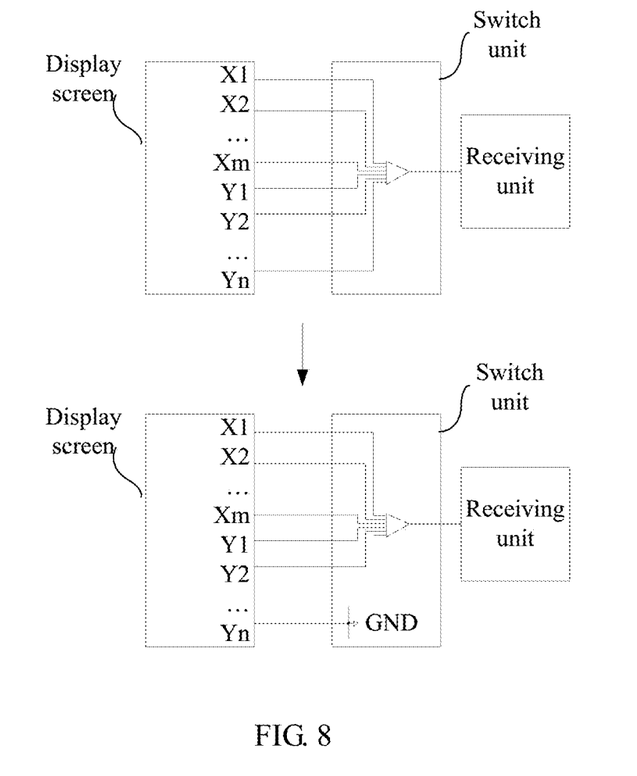
FIG. 8 is a schematic diagram illustrating switching of driving channels of a second terminal according to an embodiment of the present disclosure.

In the embodiments of the present disclosure, when the second terminal 20 adjusts the connection of the driving channel and/or the sensing channel of the second terminal 20, the second terminal 20 may switch at least one driving channel and/or sensing channel of, for example, the display screen or communication module or the like of the second terminal 20 to a predetermined node. The predetermined node may be a positive pole of a power supply, a system ground GND, an input buffer end or an output buffer end; or the predetermined node may be suspended, that is, the driving channel and/or the sensing channel is in a suspension state. For example, as illustrated in FIG. 7, if $Y_1$-$Y_n$ represent driving channels of the display screen/touch screen of the second terminal 20 and $X_1$-$X_m$ represent sensing channels of the display screen of the second terminal 20, the sensing channels $X_1$ and $X_2$ of the display screen may be connected to the system ground GND. Then, the second terminal 10 redetects whether the coupling capacitance between the first terminal 10 and the second terminal 20 is less than the predetermined value, and establishes communication between the first terminal 10 and the second terminal 20 if it is detected that the coupling capacitance between the first terminal 10 and the second terminal 20 is greater than or equal to the predetermined value. If it is detected that the coupling capacitance between the first terminal 10 and the second terminal 20 is still less than the predetermined value, the driving channel or the sensing channel of the second terminal 20 may be still switched to the predetermined node. For example, as illustrated in FIG. 8, in this case, the driving channel $Y_n$ of the display screen may be connected to the system ground GND. Then, the second terminal 20 repeats the detection process of the coupling capacitance value, until the second terminal 20 detects that the coupling capacitance is greater than or equal to the predetermined value.

It should be understood that the second terminal 20 may randomly switch the driving channel or the sensing channel of the second terminal 20, and the switching manner may be randomly defined. That is, the adjusting module 20 may randomly define which driving channel and/sensing channel of the terminal is to be switched by the second terminal 20 and to which predetermined node the channel is to be switched. If after the channel switching, the coupling capacitance between the first terminal 10 and the second terminal 20 is still less than the predetermined value, it indicates that the communication signal received by the second terminal is still not sufficiently good, and it is probable that the poor signal is caused because the action of switching the channel is not sufficiently great. In this case, the second terminal may additionally switch another part of the driving channels/sensing channels. The driving channel or the sensing channel may be switched in any combination manner, which falls within the protection scope of the present disclosure. To avoid redundancy, no detailed description is given to the combination manner for the channel switching.

In addition, it should be understood that a person skilled in the art may make equivalent replacements or variations to the above manners. For example, if the first terminal 10 is a mobile phone and the second terminal 20 is a laptop computer having a near-field communication module, or the second terminal 20 is a laptop computer having a capacitive touch panel or the like, the second terminal 20 may also detect the coupling capacitance between the first terminal 10 and the second terminal 20 in the above manners, and switch the driving channel or the sensing channel of the near-field communication module or the touch panel of the second terminal 10, to increase the coupling capacitance between the first terminal 10 and the second terminal 20, which all fall within the protection scope of the present disclosure.

Then, after the second terminal 20 detects that the coupling capacitance between the first terminal 10 and the second terminal 20 is greater than or equal to the predetermined value, and the second terminal 20 judges that the communication signal received by the second terminal 20 is a signal sent by the first terminal 10, the second terminal 20 may enter a sending mode from a receiving mode and send a response signal to the first terminal 10. The second terminal 20 establishes communication with the first terminal 10. After processing relevant communication, the second terminal 20 terminates the communication with the first terminal 10, that is, the second terminal 20 exits the communication mode.

It should be understood that after the second terminal 20 switches the driving channel/the sensing channel of the second terminal 20 and the second terminal 20 establishes communication with the first terminal 10, that is, during the communication between the two terminals, the second terminal 20 constantly stays in a configuration mode of the switched channel when the second terminal 20 receives/sends the communication signal. As such, it may be ensured that the circuit features between the second terminal 20 and the first terminal 10 constantly remain consistent, and normal communication between the second terminal 20 and the first terminal 10 may be ensured.

In addition, besides the case in the above embodiments, the second terminal 20 may also be an initiating end of the communication, and the first terminal 10 may be a peer end of the initiating end, that is, the second terminal 20 is an initiator of the communication and the first terminal 10 is a receptor of the communication. In this case, after the second terminal 20 approaches the first terminal 10, the second terminal 20 enters the communication mode from a working state, that is, the second terminal 20 is in a sending state after entering the communication mode. The second terminal 20 initiates settings thereof, and when the second terminal 20 is in a sending state, the first terminal 10 detects whether the coupling capacitance between the first terminal 10 and the second terminal 20 is less than the predetermined value. Upon sending a signal, the second terminal 20 switches its state, and enters the receiving state from the sending state. In this case, the second terminal 20 starts detecting whether the coupling capacitance between the first terminal 10 and the second terminal 20 is less than the predetermined value, and adjusts the coupling capacitance between the first terminal 10 and the second terminal 20 by adjusting a connection of the driving channel and/or the sensing channel of the second terminal 20 when it is detected that the coupling capacitance between the first terminal 10 and the second terminal 20 is less than the predetermined value. It should be understood that the manners in which the second terminal 20 detects the coupling capacitance and adjusts the coupling capacitance are the same as those described in the above embodiments, which are thus not described herein any further.

With the near-field communication system according to embodiments of the present disclosure, during communication between a first terminal and a second terminal, if the second terminal detects that the coupling capacitance between the second terminal and the first terminal is too small, an electrical connection of a driving channel and/or a sensing channel of the second terminal may be switched. Accordingly, when the communication between the second terminal and the first terminal fails, the case of poor coupling of screen signals is prevented in a manner of switching receiving and sending channels via software, such that a user is capable of normally communicating with a first terminal by using a second terminal at any angle, thereby reducing additional operations of the user while improving the success rate and efficiency during the communication, and improving the user experience.

To practice the above embodiments, the present disclosure further provides a terminal.

Figure 9:
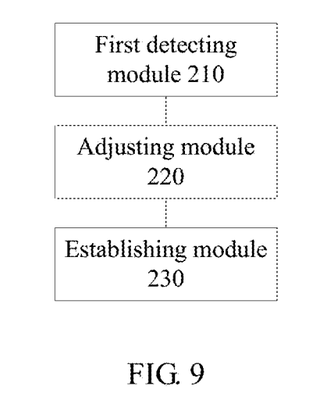
FIG. 9 is a schematic structural diagram illustrating a terminal according to an embodiment of the present disclosure.

FIG. 9 is a schematic structural diagram illustrating a terminal according to an embodiment of the present disclosure. As illustrated in FIG. 9, the terminal includes a first detecting module 210, an adjusting module 220 and an establishing module 230.

To be specific, the first detecting module 210 is configured to detect whether a coupling capacitance between the terminal and another terminal is less than a predetermined value.

In the embodiments of the present disclosure, the terminal and the another terminal may be both, but not limited to, one of a mobile phone, a laptop computer, a tablet computer, a palm computer and a POS machine; and the another terminal is an initiating end of the communication and the terminal is a peer end of the initiating end. In other words, the another terminal is an initiator of the communication and the terminal is a receptor of the communication. To be specific, the terminal according to the embodiments of the present disclosure is described hereinafter by using the scenario where the another terminal and the terminal are both mobile phones and both have a touch display screen as an example.

When the terminal approaches the another terminal, the terminal enters a near-field communication mode, and then the terminal initializes its own settings, for example, selecting a driving channel and a sensing channel of its own display screen, switching a switch unit connected to the driving channel and the sensing channel of the display screen, and setting a receiving unit or the like connected to the display screen. The display screen may be a touch screen, which may be preferably a capacitive touch screen.

Then, the first detecting module 210 is further configured to detect whether a coupling capacitance between the terminal and another terminal is less than a predetermined value. To be specific, after the terminal enters the communication mode, the terminal is in a receiving state, and the first detecting module 210 may monitor in real time in the communication mode, a communication signal sensed by the display screen thereof from the another terminal. The first detecting module 210 may receive a communication signal from the another terminal or send a communication signal to the another terminal via, for example, a part of the driving channels and sensing channels in the display screen of the terminal. In other words, the first detecting module 210 may define that the terminal receives/sends a communication signal via the entire screen of the display screen thereof, or may define that the terminal receives/sends a communication signal via a part of screen of the display screen thereof. In this way, the signal-to-noise ratio of the terminal may be improved, and the power consumed by the terminal may be reduced. In other words, the first detecting module 210 may detect in real time whether the coupling capacitance between the terminal and the another terminal is less than the predetermined value within a predetermined window time period.

The adjusting module 220 is configured to, when it is detected that the coupling capacitance between the terminal and the another terminal is less than the predetermined value, adjust a connection of a driving channel and/or a sensing channel of the terminal, to adjust the coupling capacitance between the terminal and the another terminal.

If the first detecting module 210 detects that the coupling capacitance between the terminal and the another terminal within the predetermined window time period is less than the predetermined value, and detects that the communication signal between the terminal and the another terminal is a valid signal, the adjusting module 220 adjusts the coupling capacitance between the terminal and the another terminal by adjusting the connection of the driving channel and/or the sensing channel of the terminal. In other words, if the terminal receives no communication signal within the predetermined window time period or the received communication signal is relatively weak, that is, the coupling capacitance between the terminal and the another terminal is smaller or 0, the driving channel and the sensing channel of the terminal are switched to implement electrical features of the terminal in another deployment. It should be noted that if the first detecting module 210 detects that the coupling capacitance between the terminal and the another terminal within the predetermined window time period is greater than or equal to the predetermined value, the establishing module 230 may establish the communication between the terminal and the another terminal.

In the embodiments of the present disclosure, when the adjusting module 220 adjusts the connection of the driving channel and/or the sensing channel of the terminal, the adjusting module 220 may switch at least one driving channel and/or sensing channel of, for example, the display screen or communication module or the like, the terminal to a predetermined node. The predetermined node may be a positive pole of a power supply, a system ground GND, an input buffer end or an output buffer end; or the predetermined node may be suspended, that is, the driving channel and/or the sensing channel is in a suspension state. For example, as illustrated in FIG. 7, if $Y_1$-$Y_n$ represent driving channels of the display screen of the terminal and $X_1$-$X_m$ represent sensing channels of the display screen of the terminal, the sensing channels $X_1$ and $X_2$ of the display screen may be connected to the system ground GND. Then, the first detecting module 210 redetects whether the coupling capacitance between the terminal and the another terminal is less than the predetermined value. If it is detected that the coupling capacitance between the terminal and the another terminal is greater than or equal to the predetermined value, the establishing module 230 establishes the communication between the terminal and the another terminal. If the first detecting module 210 detects that the coupling capacitance between the terminal and the another terminal is still less than the predetermined value, the adjusting module 220 may still switch the driving channel or the sensing channel of the terminal to the predetermined node. For example, as illustrated in FIG. 8, in this case, the driving channel $Y_n$ of the display screen may be connected to the system ground GND. Then, the first detecting module 210 repeats the detection process of the coupling capacitance value, until the first detecting module 210 detects that the coupling capacitance is greater than or equal to the predetermined value.

It should be understood that the adjusting module 220 may randomly switch the driving channel or the sensing channel of the terminal, and the switching manner may be randomly defined. That is, the adjusting module 220 may randomly define which driving channel and/sensing channel of the terminal is to be switched by the adjusting module 220 and to which predetermined node the channel is to be switched. If after the channel switching, the coupling capacitance between the terminal and the another terminal is still less than the predetermined value, it indicates that the communication signal received by the terminal is still not sufficiently good, and it is probable that the poor signal is caused because the action of switching the channel is not sufficiently great. In this case, the adjusting module 220 may additionally switch another part of the driving channels/sensing channels. The driving channel or the sensing channel may be switched in any combination manner, which falls within the protection scope of the present disclosure. To avoid redundancy, no detailed description is given to the combination manner for the channel switching.

In addition, it should be understood that a person skilled in the art may make equivalent replacements or variations to the above manners. For example, if the another terminal is a mobile phone and the terminal is a laptop computer having a near-field communication module, or the terminal is a laptop computer having a capacitive touch panel or the like, the first detecting module 210 may also detect the coupling capacitance between the terminal and the another terminal in the above manners, and the adjusting module 220 switches the driving channel or the sensing channel of the near-field communication module or the touch panel of the another terminal, to increase the coupling capacitance between the terminal and the another terminal, which all fall within the protection scope of the present disclosure.

The establishing module 230 is configured to establish communication between the terminal and the another terminal when it is detected that the coupling capacitance between the terminal and the another terminal is greater than or equal to the predetermined value.

To be specific, when the first detecting module 210 detects that the coupling capacitance between the terminal and the another terminal is greater than or equal to the predetermined value, and the first detecting module 210 judges that the communication signal received by the terminal is a signal sent by the another terminal, the terminal may enter a sending mode from a receiving mode and send a response signal to the another terminal. The establishing module 230 establishes a communication connection of the terminal and the another terminal. After processing relevant communication, the establishing module 230 terminates the communication with the another terminal, that is, the terminal exits the communication mode.

It should be understood that after the adjusting module 220 switches the driving channel/the sensing channel of the terminal and the establishing module 230 establishes the communication between the terminal and the another terminal, that is, during the communication between the two terminals, the terminal constantly stays in a configuration mode of the switched channel when the adjusting module 220 receives/sends the communication signal. As such, it may be ensured that the circuit features between the terminal and the another terminal constantly remain consistent, and normal communication between the terminals may be ensured.

In addition, besides the case in the above embodiments, the terminal may also be an initiating end of the communication, and the another terminal may be a peer end of the initiating end, that is, the terminal is an initiator of the communication and the another terminal is a receptor of the communication. In this case, after the terminal approaches the another terminal, the terminal enters the communication mode from a working state, that is, the terminal is in a sending state after entering the communication mode. Then, the terminal initializes settings thereof, and when the terminal is in the sending state, the another terminal detects whether the coupling capacitance between the another terminal and the terminal is less than the predetermined value. Upon sending a signal, the terminal switches its state, and enters the receiving state from the sending state. In this case, the terminal starts detecting whether the coupling capacitance between the terminal and the another terminal is less than the predetermined value, and adjusts the coupling capacitance between the terminal and the another terminal by adjusting a connection of the driving channel and/or the sensing channel of the terminal when it is detected that the coupling capacitance between the terminal and the another terminal is less than the predetermined value. It should be understood that the manners in which the terminal detects the coupling capacitance and adjusts the coupling capacitance are the same as those described in the above embodiments, which are thus not described herein any further.

With the terminal according to embodiments of the present disclosure, during communication between a terminal and another terminal, if the terminal detects that the coupling capacitance between the terminal and the another terminal is too small, an electrical connection of a driving channel and/or a sensing channel of the terminal may be switched. Accordingly, when the communication between the terminal and the another terminal fails, the case of poor coupling of screen signals is prevented in a manner of switching receiving and sending channels via software, such that a user is capable of normally communicating with another terminal by using a terminal at any angle, thereby reducing additional operations of the user while improving the success rate and efficiency during the communication, and improving the user experience.

Figure 10:
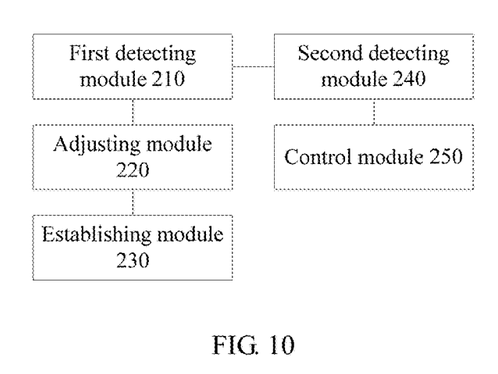
FIG. 10 is a schematic structural diagram illustrating a terminal according to a specific embodiment of the present disclosure.

FIG. 10 is a schematic structural diagram illustrating a terminal according to a specific embodiment of the present disclosure. As illustrated in FIG. 10, the terminal includes a first detecting module 210, an adjusting module 220, an establishing module 230, a second detecting module 240 and a control module 250.

To be specific, the second detecting module 240 is configured to detect whether a duration elapsed for establishing the communication between a terminal and another terminal is greater than a predetermined threshold.

The control module 250 is configured to control the terminal to exit the communication mode when it is detected that the duration elapsed for establishing the communication between the terminal and the another terminal is greater than the predetermined threshold.

To be specific, after the first detecting module 210 detects that a coupling capacitance between the terminal and the another terminal within a predetermined window time period is less than a predetermined value, the second detecting module 240 may detect whether the time elapsed when the terminal requests to establish the communication with the another terminal after entering the communication mode is greater than a predetermined threshold. When the second detecting module 240 detects that the time elapsed for establishing the communication is greater than the predetermined threshold, the control module 250 controls the terminal to exit the communication mode. In other words, if the terminal judges that the total time elapsed for establishing the communication exceeds the predetermined threshold, the terminal may directly terminate the communication with the another terminal.

With the terminal according to the embodiments of the present disclosure, by detecting whether the time elapsed for establishing communication between the terminal with another terminal is greater than a predetermined threshold, the terminal exits the communication mode when the time is greater than the predetermined threshold. In this way, the power consumed by the terminal may be further reduced.

To practice the above embodiments, the present disclosure further provides a near-field communication method.

The near-field communication method is described hereinafter with reference to the terminal according to the second aspect of the embodiments of the present disclosure. Specifically, the method may be referenced to the content of the terminal in the second aspect of the embodiments of the present disclosure.

Figure 11:
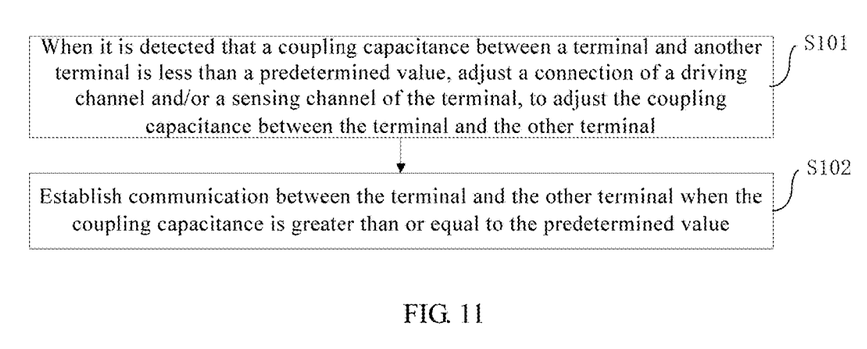
FIG. 11 is a flowchart illustrating a near-field communication method according to an embodiment of the present disclosure.

FIG. 11 is a flowchart illustrating a near-field communication method according to an embodiment of the present disclosure. As illustrated in FIG. 11, the near-field communication method includes the following steps.

S101: When it is detected that a coupling capacitance between a terminal and another terminal is less than a predetermined value, a connection of a driving channel and/or a sensing channel of the terminal is adjusted, to adjust the coupling capacitance between the terminal and the another terminal.

In the embodiments of the present disclosure, when the terminal approaches another terminal, the terminal enters the communication mode, and detects in the communication mode whether a coupling capacitance between the another terminal and the terminal is less than a predetermined value.

In the embodiments of the present disclosure, the terminal receives a signal from the another terminal or sends a signal to the another terminal via a part of the driving channels and sensing channels of the terminal.

In the embodiments of the present disclosure, it is detected whether the time elapsed for establishing communication between the terminal and the another terminal is greater than a predetermined threshold, and the terminal is controlled to exit the communication mode when it is detected that the time elapsed for establishing communication between the terminal and the another terminal is greater than the predetermined threshold.

In the embodiments of the present disclosure, at least one driving channel and/or sensing channel of the terminal is switched to a predetermined node. The predetermined node is a positive pole of a power supply, a system ground, an input buffer end or an output buffer end.

S102: Communication between the terminal and the another terminal is established when it is detected that the coupling capacitance between the terminal and the another terminal is greater than or equal to the predetermined value.

With the near-field communication method according to embodiments of the present disclosure, during communication between a terminal and another terminal, if the terminal detects that the coupling capacitance between the terminal and the another terminal is too small, an electrical connection of a driving channel and/or a sensing channel of the terminal may be switched. Accordingly, when the communication between the terminal and the another terminal fails, the case of poor coupling of screen signals is prevented in a manner of switching receiving channels and sending channels via software, such that a user is capable of normally communicating with another terminal by using a terminal at any angle, thereby reducing additional operations of the user while improving the success rate and efficiency during the communication, and improving the user experience.

It should be understood that each part of the present disclosure may be implemented by using hardware, software, firmware or a combination of them. In the above embodiments, the multiple steps or methods may be implemented by using software or firmware which is stored in a memory and executed by a suitable instruction execution system. For example, if the multiple steps or methods are implemented by using hardware, similar to another embodiment, the steps or methods may be implemented by using any one or a combination of the following technologies that are commonly known in the art: a discrete logic circuit of a logic gate circuit configured to implement logic function to data signals, an application specific integrated circuit having a suitable combinational logic gate, a programmable gate array (PGA), a field-programmable gate array (FPGA), and the like.

In the description of the present specification, reference terms such as "an embodiment", "some embodiments", "examples", "specific examples", "some examples", or the like are intended to refer to that the specific features, structures, materials, or characteristics which are described in combination with the embodiments or examples are included in at least one embodiment or example of the present disclosure. In this specification, schematic expressions of the above terms do not necessarily indicate the same embodiments or examples. In addition, the described specific features, structures, materials, or characteristics may be combined in any one or multiple embodiments or examples in a suitable way.

Although the embodiments of the present disclosure are described in detail above, persons or ordinary skill in the art may understand that without departing from the principle and intention of the present disclosure, various variations, modifications and replacements may be made to these embodiments, and the scope of the present disclosure is defined by the appended claims and their equivalents.

What is claimed is:

1. A near-field communication system, comprising:
a first terminal; and
a second terminal, configured to:
when it is detected during establishment of communication between the first terminal and the second terminal that a coupling capacitance between the first terminal and the second terminal is less than a predetermined value, adjust a connection of a driving channel and/or a sensing channel of the second terminal, to adjust the coupling capacitance between the second terminal and the first terminal; and establish communication between the second terminal and the first terminal when it is detected that the coupling capacitance between the first terminal and the second terminal is greater than or equal to the predetermined value.

2. The near-field communication system according to claim 1, wherein the second terminal switches at least one driving channel and/or sensing channel of the second terminal to a predetermined node.

3. The near-field communication system according to claim 2, wherein the predetermined node is a positive pole of a power supply, a system ground, an input buffer end or an output buffer end.

4. The near-field communication system according to claim 3, wherein the second terminal receives a signal from the first terminal or sends a signal to the first terminal both via a part of the driving channels and sensing channels of the second terminal.

5. The near-field communication system according to claim 4, wherein when the second terminal approaches the first terminal, the second terminal enters a communication mode, and detects whether the coupling capacitance between the first terminal and the second terminal is less than the predetermined value in the communication mode.

6. The near-field communication system according to claim 5, wherein the second terminal detects whether a duration elapsed for establishing the communication with the first terminal is greater than a predetermined threshold, and exits the communication mode when it is detected that the duration elapsed for establishing the communication is greater than the predetermined threshold.

7. A terminal, comprising:
   a first detecting module, configured to detect during establishment of communication between the terminal and another terminal whether a coupling capacitance between the terminal and the another terminal is less than a predetermined value;
   an adjusting module, configured to, when it is detected that the coupling capacitance between the terminal and the another terminal is less than the predetermined value, adjust a connection of a driving channel and/or a sensing channel of the terminal, to adjust the coupling capacitance between the terminal and the another terminal; and
   an establishing module, configured to establish communication between the terminal and the another terminal when it is detected that the coupling capacitance between the terminal and the another terminal is greater than or equal to the predetermined value.

8. The terminal according to claim 7, wherein the adjusting module is specifically configured to:
   switch at least one driving channel and/or sensing channel of the terminal to a predetermined node.

9. The terminal according to claim 8, wherein the predetermined node is a positive pole of a power supply, a system ground, an input buffer end or an output buffer end.

10. The terminal according to claim 9, wherein the terminal receives a signal from the another terminal or sends a signal to the another terminal both via a part of the driving channels and sensing channels of the terminal.

11. The terminal according to claim 10, wherein when the terminal approaches the another terminal, the terminal enters a communication mode, and detects in the communication mode whether the coupling capacitance between the terminal and the another terminal is less than the predetermined value.

12. The terminal according to claim 11, further comprising:
   a second detecting module, configured to detect whether a duration elapsed for establishing the communication between the terminal and the another terminal is greater than a predetermined threshold; and
   a control module, configured to control the terminal to exit the communication mode when it is detected that the duration elapsed for establishing the communication between the terminal and the another terminal is greater than the predetermined threshold.

13. A method for near-field communication, comprising:
   detecting a coupling capacitance between a terminal and another terminal during establishment of communication between the terminal and the another terminal;
   adjusting a connection of a driving channel and/or a sensing channel of the terminal and/or the another terminal to adjust the coupling capacitance if the coupling capacitance is less than a predetermined valve; and
   establishing communication between the terminal and the another terminal if the coupling capacitance is greater than or equal to the predetermined value.

14. The method according to claim 13, wherein at least one driving channel and/or sensing channel of the terminal and/or the another terminal is switched to a predetermined node.

15. The method according to claim 14, wherein the predetermined node is a positive pole of a power supply, a system ground, an input buffer end or an output buffer end.

16. The method according to claim 15, wherein the another terminal receives a signal from the terminal or sends a signal to the terminal via a part of the driving channels and sensing channels of the another terminal.

17. The method according to claim 16, wherein when the another terminal approaches the terminal, the another terminal enters a communication mode, and detects whether the coupling capacitance between the another terminal and the terminal is less than the predetermined value.

18. The method according to claim 17, comprising: detecting whether a duration elapsed for establishing the communication between the another terminal and the terminal is greater than a predetermined threshold, and controlling the another terminal to exit the communication mode when the duration elapsed for establishing the communication is greater than the predetermined threshold.

* * * * *